Oct. 13, 1953 G. A. DONATH 2,654,939
STORAGE BATTERY GRID PLATE CASTING AND TRIMMING MACHINE
Filed Dec. 15, 1947 5 Sheets-Sheet 4
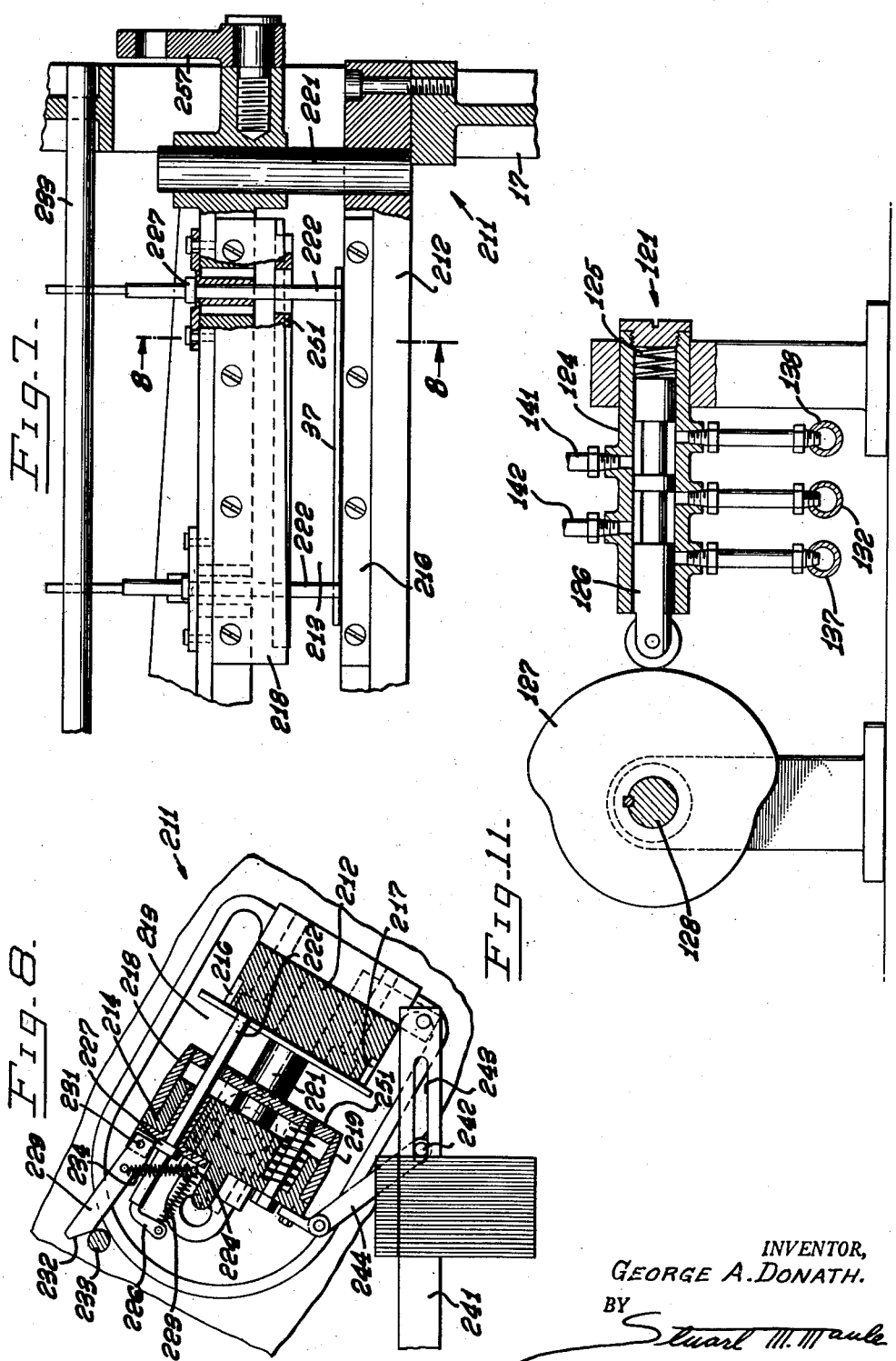
INVENTOR,
GEORGE A. DONATH.
BY
ATTORNEY.

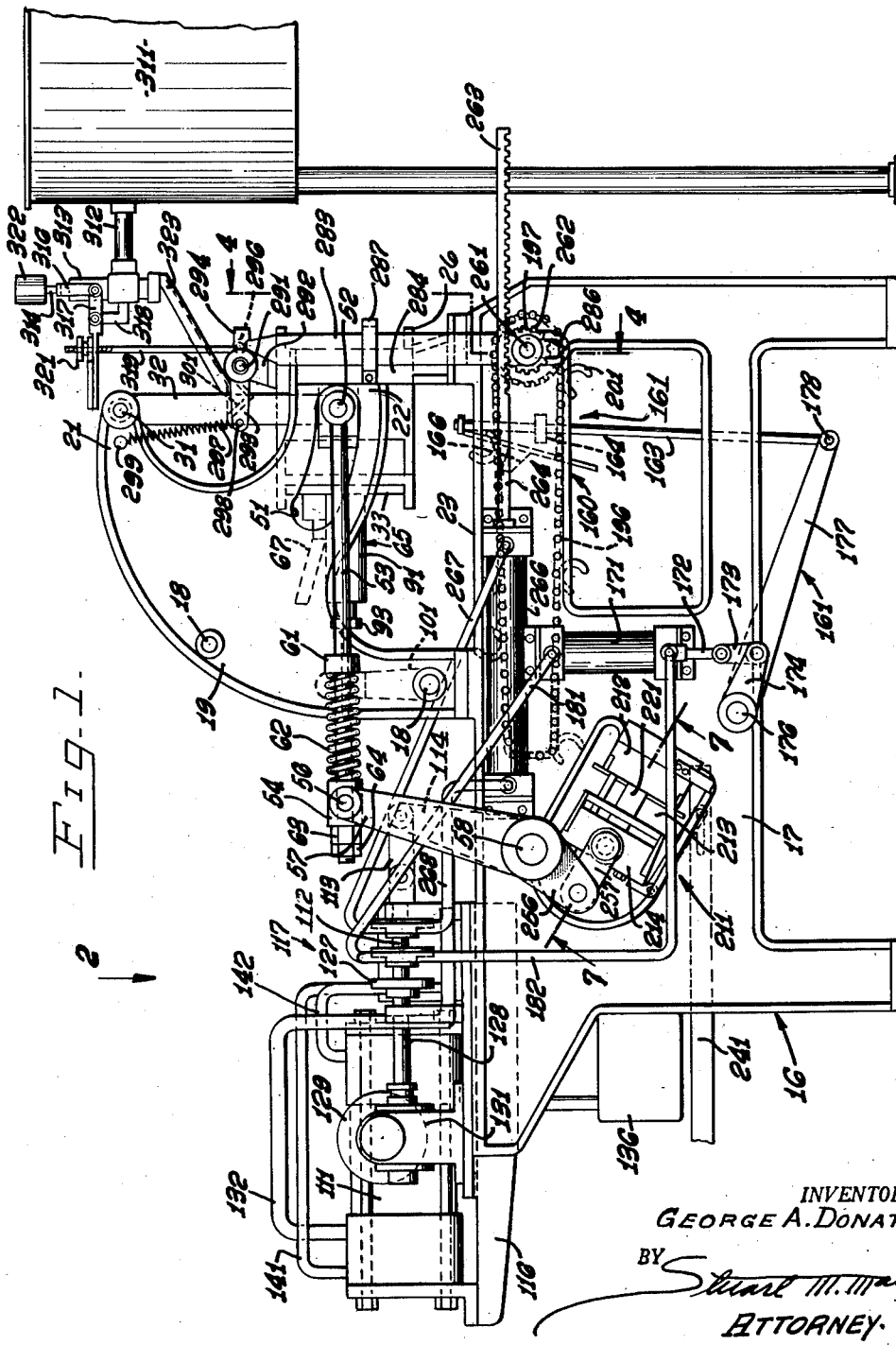

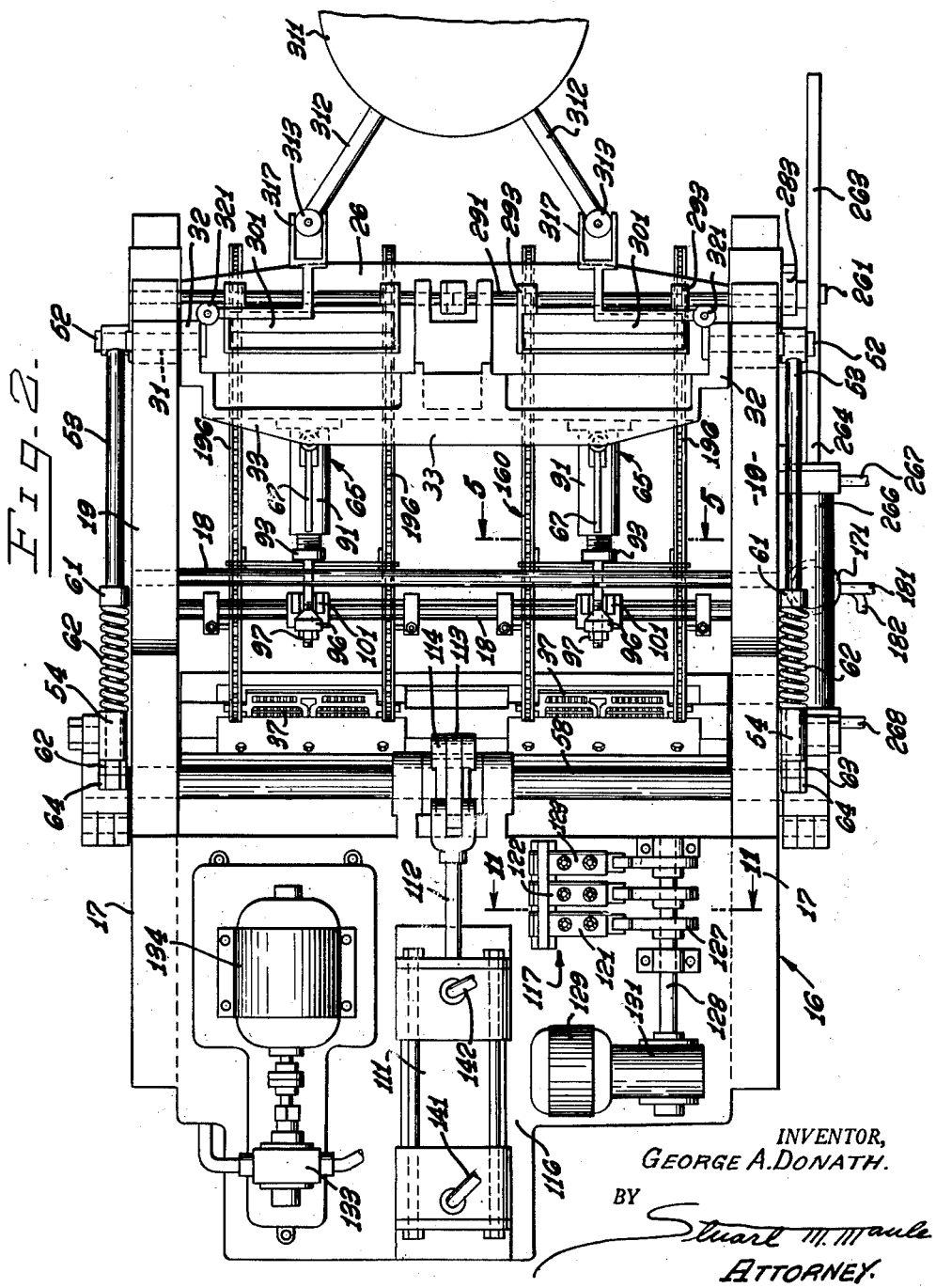

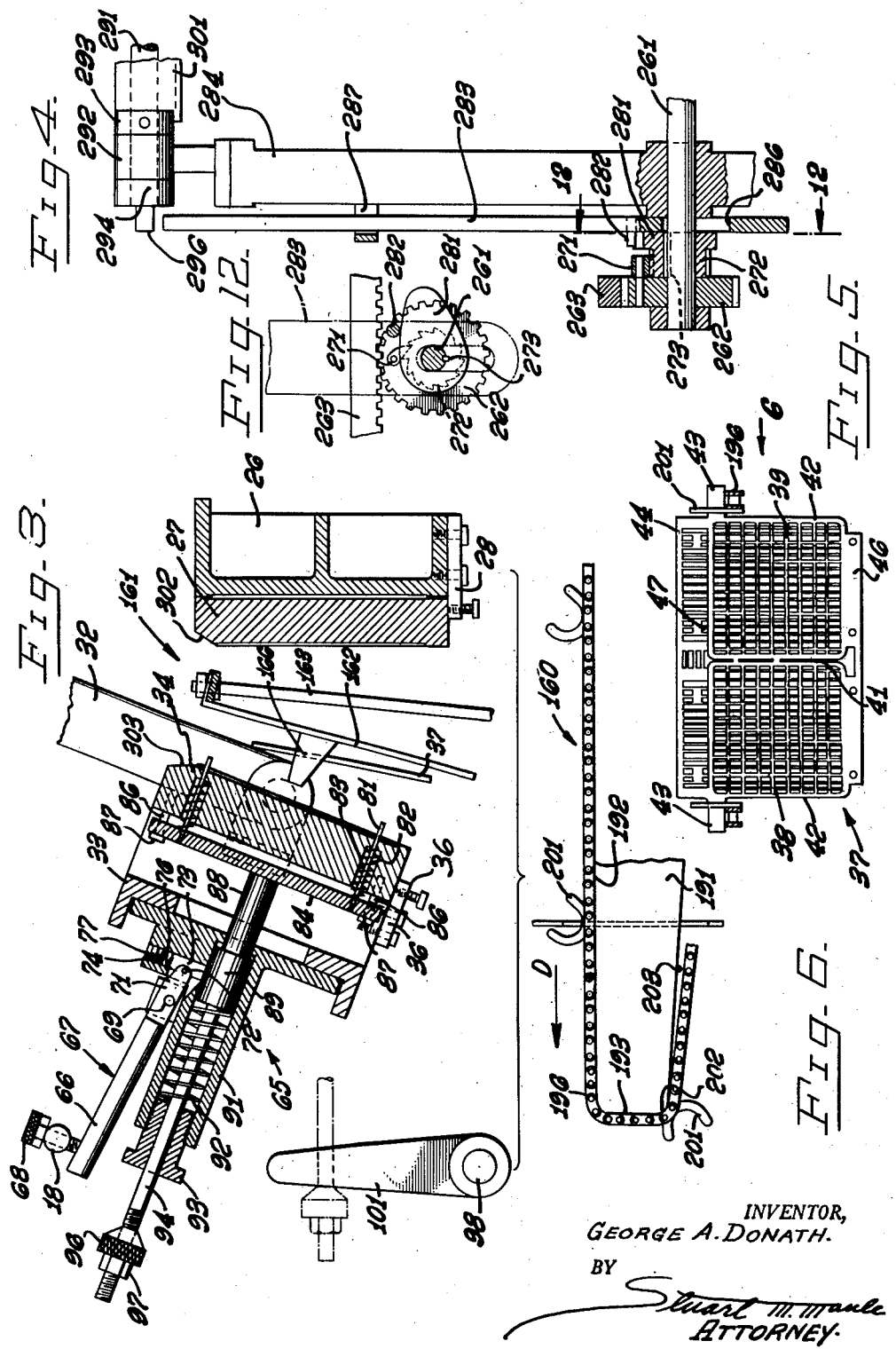

Oct. 13, 1953  G. A. DONATH  2,654,939
STORAGE BATTERY GRID PLATE CASTING AND TRIMMING MACHINE
Filed Dec. 15, 1947  5 Sheets-Sheet 5
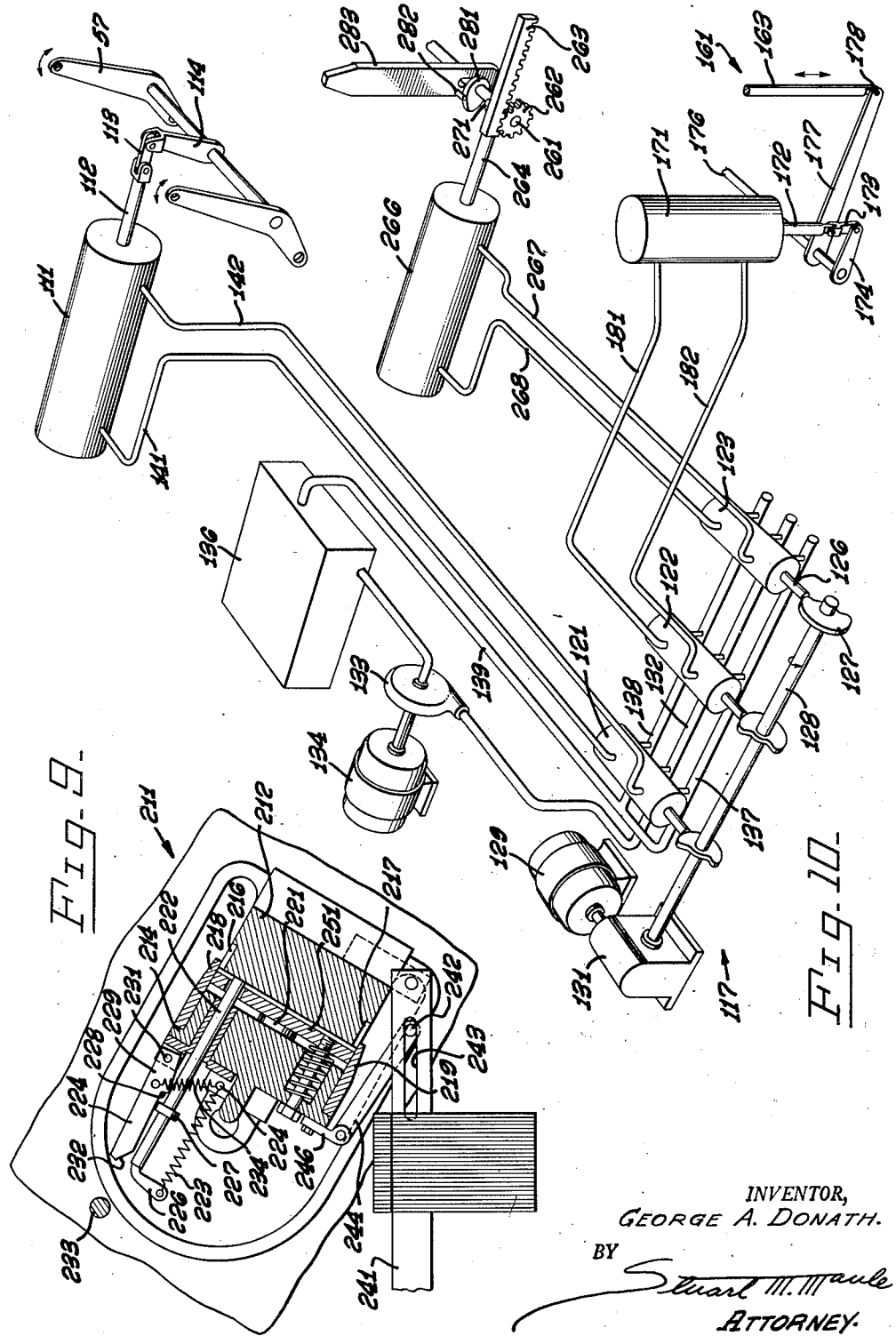
INVENTOR,
GEORGE A. DONATH.
BY
Stuart M. Maule
ATTORNEY.

Patented Oct. 13, 1953

2,654,939

UNITED STATES PATENT OFFICE 2,654,939

STORAGE BATTERY GRID PLATE CASTING AND TRIMMING MACHINE

George A. Donath, Los Angeles, Calif.

Application December 15, 1947, Serial No. 791,766

9 Claims. (Cl. 29—2)

This invention relates to metal working, and more particularly to machines for performing the specialized work of casting and trimming storage battery grid plates.

An object of the present invention is to provide a storage battery grid plate casting and trimming machine which constitutes an improvement over that forming the subject matter of Patent No. 2,156,379, issued to me on May 2, 1939.

A more detailed object in this connection is to provide improved and simplified means for mounting the movable mold section, which greatly simplifies the construction with consequent increase in operative efficiency and dependability of operation over prolonged periods of hard usage, and still materially reduces the machine's manufacturing cost.

A further object of the present invention is to provide an improved transferring mechanism for conveying the grid plates from the mold in which they have been cast to the trimming mechanism.

A further object is to provide a storage battery grid plate casting and trimming mechanism, the operative parts of which are actuated hydraulically, thereby providing for efficient, dependable, positive, and quiet operation with a minimum of friction between moving parts and a consequent saving in the amount of power required for operation of the machine.

Yet another object is to provide controls for the hydraulic mechanism operated by cams, not the least advantageous feature of which is that it makes for ease of synchronization of the moving parts of the machine so as to assure the operation of each part exactly at the proper time within the machine's cycle.

Referring to the drawings:

Figure 1 is a view in side elevation of a storage battery grid plate casting and trimming machine, incorporating the principles of the present invention, a portion of the figure being broken away to reduce its size.

Figure 2 is a top plan view, as indicated by the arrow 2 of Figure 1.

Figure 3 is a detail view drawn to enlarged scale and in longitudinal, vertical section through the grid casting mold which is shown in open position. This view also shows the manner in which a grid plate, after having been discharged from the mold, is lowered therefrom by the elevator.

Figure 4 is an enlarged detail view, taken in compound vertical section upon the lines 4—4 of Figure 1, with the direction of view as indicated.

Figure 5 is an enlarged detail view in transverse vertical section, taken through the mechanism for conveying the grid plates into the trimming mechanism. The plane of section is indicated by the line 5—5 of Figure 2, and the direction of view by the arrows.

Figure 6 is a view in side elevation of the conveyor of Figure 5, the direction of view being indicated by the arrow 6 of that figure.

Figure 7 is an enlarged detail view, taken partially in plan and partially in section, upon the inclined plane indicated by the line 7—7 of Figure 1 through the trimming mechanism.

Figure 8 is a longitudinal, vertical sectional view taken through the trimming mechanism on the line 8—8 of Figure 7, with the direction of view as indicated.

Figure 9 is a view similar to Figure 8, but showing the trimming mechanism closed.

Figure 10 is a schematic view of the hydraulic controls.

Figure 11 is an enlarged detail view in transverse vertical section, taken upon the line 11—11 of Figure 2, with the direction of view as indicated.

Figure 12 is a detail view in vertical section taken upon the line 12—12 of Figure 4, with the direction of view as indicated by the arrows.

Specifically describing a preferred embodiment of a storage battery grid plate casting and trimming machine incorporating the principles of the present invention, the frame 16 of the machine comprises a pair of spaced, parallel side members 17 which are rigidly interconnected by suitable cross members, such as the stay bolts 18, rigid with and extending between upward extensions 19, one of which is formed on each of the side members 17. Each of these extensions 19 includes an upper arm 21 and a lower arm 22, both of which extend forwardly, as is best shown in Figure 1, with the lower arm spaced above the bed 23 of the frame 16. The two lower arms 22 serve to rigidly support a stationary jaw 26, to the after face of which preferably a pair of stationary mold sections 27 are removably secured as by a series of suitable clamps 28.

A pair of axially aligned pivot pins 31 are carried by the upper arms 21, and upon these pins 31 downwardly extending links 32 are pivoted. The function of these links 32 is to support a movable jaw 33 which is rigidly secured to the lower ends of the two links 32 and which, therefore, partakes of their pivotal movement about the axis of the aligned pivot pins 31. To the forward face of the movable jaw 33, a movable mold section 34 is releasably secured as by a series of clamps 36, in cooperative relation with each of the stationary mold sections 27.

The parts are so proportioned and arranged that when the links 32 hang substantially vertically downwards from the pivot pins 31, the two mold sections 27 and 34 are in contact with each other to define a complete mold cavity, the configuration of which is suitable for the formation of a casting 37 which, as is clearly shown in Figure 5, defines two complete battery grid plates 38 and 39 joined to each other along those edges 41 thereof which will constitute their lower edges when the grid plates are assembled in a storage battery. Preferably the mold cavity is milled out accurately so as to define the outermost side bars 42 and lugs 43 extending laterally outwards therefrom in true-finished form, but the two sections 38 and 39 of the casting 37 are interconnected by a top deadhead 44 and a bottom waste strip 46 which it is the function of the trimming mechanism to remove, as will be explained in detail hereinbelow. Within the deadhead 20, a series of small openings 47 are formed by protrusions (not shown) from the matrix face of the movable mold section 34. The cast will cling to these protrusions as the mold opens, as described in my aforesaid patent, No. 2,156,379, and thus insure that the cast will come away from the stationary mold section 27, the corresponding portion of which is left free of such protrusions.

Transversely aligned openings 51 are formed in the two lower arms 22 of the frame extensions 19. These openings 51 are preferably of arcuate form about the axis of the pivot pins 31 so as to accommodate wrist pins 52 which extend laterally outwards from opposite sides of the movable jaw 33 and which, therefore, move in arcuate paths as the movable jaw 33 moves toward and away from the stationary jaw 26. On each of the wrist pins 52, a connecting rod 53 is pivotally mounted at its outer end, the inner end of each rod 53 being slidably mounted in a block 54. Each block 54 is pivotally connected by a crank pin 56 to the upper end of a crank 57 rigid with and extending upwardly from a transverse rock shaft 58 journalled adjacent its ends in suitable bearings (not shown) in the two side members 17 of the frame 16.

Rigidly and preferably adjustably secured on each of the connecting rods 53 is a collar 61; and a coil spring 62 is under compression between each collar 61 and the associated block 54, a degree of compression of each spring 62 preferably being regulable by means of a nut 63 threaded to the associated connecting rod 53 and bearing against the opposite end of the associated block 54 from that against which the associated spring 62 bears. A lock nut 64 also is provided on each connecting rod 53 as a precautionary measure to preserve the adjustment of the associated nut 63.

Thus it may be seen that when the rock shaft 58 is turned in a clockwise direction as viewed upon Figure 1, the movable jaw 33, and with it the movable mold section 34, are moved toward the stationary mold section 27. The parts are so proportioned and arranged that the rotary movement of the rock shaft 58 in this direction continues for a few degrees of rotation beyond that position in which the two mold sections 27 and 34 are brought into contact with each other. This excess movement of the rock shaft 58 and with it, of the two opposite cranks 57, is compensated for by compression of the springs 62, thus assuring complete closure of the mold by resilient pressure. When the rock shaft 58 and cranks 57 turn in the opposite direction, the movable mold section 34 is withdrawn from the stationary mold section 27 in an arcuate movement which causes the movable mold section 34, when disposed at its position of maximum spacing from the stationary mold section 27, to assume an inclined position wherein its lower edge is spaced farther from the stationary mold section 27 than is its upper edge, as clearly shown in Figure 3.

A casting-ejecting mechanism 65 is mounted upon the movable jaw 33 in operative relation with each of the movable mold sections 34, and inasmuch as these several ejecting mechanisms 65 are of similar construction, it will suffice for the purpose of the present disclosure to describe but one of them in detail.

As the movable mold section 34 approaches its outward limit of movement with a hardened cast adhering to its matrix face, one end 66 of a trigger release lever 67 engages the lower end of an abutment screw 68 which is threaded through one of the staybolts 18 of the main frame 16. This engagement causes the outer end of the arm 66 to cease its upward movement, with the result that the lever 67 is caused to rotate in a counterclockwise direction about the axis of the pivot pin 69 by which it is pivoted upon the after face of the movable jaw 33. The other end 71 of the lever 67 is connected as by a pivot pin 72 to a detent pin 73 which is mounted for substantially vertical sliding movement in a guideway 74 formed in the jaw 33. A coil spring 76 under compression between the upper end of the pin 73 and an adjusting nut 77 which is threaded into the upper end of the guideway 74 continually urges the detent pin 73 downwards.

A plurality of push-out pins 81 extend slidably through the mold section 34 in position to engage the hardened cast to be ejected from the mold section 34. Normally the pins 81 are disposed in retracted position into which they are moved to the left from that position which is illustrated in Figure 3, by coil springs 82, one of which encircles each of the push-out pins 81 within a recess 83 in the after face of the mold section 34. Each of these springs 82 is under compression between the bottom of the associated recess 83 and the plate 84 upon which all of the pins 81 are rigidly mounted. Movement of the plate 84 is guided by a plurality of pins 86 extending rigidly aft from the after face of the mold section 34; and heads 87 on these guide pins 86 restrict retractile movement of the plate 84 and its several push-out pins 81. Rigidly secured to the plate 84 is a rod 88 which extends aft from the plate 84 through the movable jaw 33. A head 89 on the after end of the rod 88 moves out from under the detent pin 73 when the plate 84 and rod 88 are fully retracted, with the result that the spring 76 is then enabled to press the detent pin 73 downwards until its lower end moves in front of the upper portion of the head 89 and thereby serves as a trigger capable of retaining the head 89 from moving to the right until the pin 73 is withdrawn. A tubular extension 91 on the after face of the movable jaw 33 accommodates a coil spring 92 which is under compression between the head 89 and a nut 93 threaded into the outer end of the tubular extension 91. From the head 89 a portion 94 of the rod 88 extends through the spring 92 and slidably through the nut 93; and to the outer end of the portion 94 of the rod 88 a collar 96 is threaded, as is also a lock nut 97 capable of retaining the collar 96 in selected position of adjustment upon the rod 94.

When the mold is closed by movement of the mold section 34 and its supporting movable jaw 33 to the right as viewed in Figure 3, the collar 96 moves in an arcuate path downwards from that position in which it is illustrated in full lines in Figure 3 to its broken line position where it engages behind preferably a pair of arms 101 extending rigidly upward from another of the staybolts 18; and the parts are so proportioned and arranged that, as closing movement of the mold is completed, the rod 88—94 is held stationary as the movable jaw 33 continues its final movement to the right. This causes retraction of the rod 88 and push-out pins 81 and plate 84 against the compression of the spring 92, with the result that the head 89 on the rod 88 is withdrawn from under the detent pin 73 whereupon it is pushed into the path of the head 89, as hereinabove explained. At the opposite end of the movable jaw's stroke, the end 66 of the lever 67 engages an abutment screw 68, causing withdrawal of the pin 73, as also explained hereinabove, whereupon the head 89 is released and the rod 88, plate 84 and pins 81 are forcibly pushed to their cast-ejecting position, inasmuch as the spring 92 is so designed that it exerts a force materially in excess of the total force of the several springs 82.

The means for opening the mold to cause ejection therefrom of a hardened cast, and subsequently thereto for closing the mold so as to enable it to receive molten material for the next grid plate to be cast at the proper respective times during the machine's cycle of operation, comprises a plunger (not shown) reciprocable within a hydraulic cylinder 111 and connected by a piston rod 112 and a link 113 to the upper end of a lever, which is illustrated in broken lines at 114 in Figure 1. This lever 114 extends rigidly upward from the rock shaft 58 preferably midway between its ends. The cylinder 111 is mounted upon a platform 116 on the after end of the frame 16, as is also a battery of hydraulic valves, indicated generally at 117.

This battery 117 consists of three valves 121, 122, and 123 and, inasmuch as the structural details of these valves are preferably conventional and therefore constitute no portion of the present invention, it will suffice for the present disclosure to explain herein that each consists of a cylinder 124 within which is reciprocable a valve (see Figure 11) urged by a spring 125 toward the left hand end of the associated cylinder 124, as viewed upon Figures 10 and 11, so as to maintain the valve rod 126 which is rigid therewith in engagement with a cam 127 disposed adjacent that end of the cylinder 124 through which the rod 126 extends. All three of these cams 127 are carried by a cam shaft 128 rotated at suitable speed as by an electric motor 129 to which the cam shaft 128 is operably connected, preferably through a speed reduction mechanism 131. Fluid under pressure is supplied at all times during operation of the machine to the central portion of each of the valve cylinders 124 by a manifold supply tube 132 which leads from a hydraulic pump 133 preferably actuated by another electric motor 134 and continuously fed from a fluid reservoir 136. Exhaust manifold tubes 137 and 138 communicate respectively with the opposite ends of all three cylinders 124 and feed back into the reservoir 136 by a common exhaust tube 139.

The outer end of the working cylinder 111 is connected by a tube 141 to that portion of the cylinder 124 of the valve 121 which is between those parts of that cylinder with which the supply manifold 132 and exhaust manifold 138 communicate. Similarly, the inner end of the working cylinder 111 is connected by another tube 142 to that portion of the cylinder 124 of the valve 121 which is between the portions of that cylinder with which the manifold supply tube 132 and manifold exhaust tube 137 communicate. Hence, when the associated valve rod 126 is pushed to the right as viewed on Figure 10, by riding upon the high portion of the associated cam 127, fluid under pressure is supplied through the valve 121 to the tube 142, retracting the plunger 112 of the cylinder 111 to the left and causing opening movement of the mold. As this movement occurs, the fluid entrapped between the piston and the after end of the cylinder is ejected through the tube 141 and through the valve 121 and into the exhaust manifold tube 138, and thence back through the tube 139 into the reservoir 136.

On the other hand, when the associated cam 127 is turned so that the valve rod 126 of the valve 121 rides on the lower part of the cam, its associated spring pushes the associated valve plunger to the left, as viewed upon Figure 10, establishing communication between the pressure manifold 132 and the tube 141, thus advancing the plunger 112 and closing the mold. As this occurs, fluid entrapped within the cylinder 111 between the plunger 112 and the end of the cylinder toward which the plunger then is moving will be ejected from the cylinder 111 back through the tube 142, valve 121, and manifold 137 and thence through the tube 139 into the reservoir 136.

Means are provided for receiving the successive castings or grid plates 37 as they are released from the open mold in accordance with the description appearing hereinabove, and for lowering them onto a conveyor which is indicated in its entirety at 160 and which will be described in greater detail hereinbelow. This means for carrying the grid plates 37 from the mold to the conveyor 160 comprises an elevator mechanism, which is indicated in its entirety at 161, in the form of a plate 162 which is supported in a position slightly inclined from the vertical upon the upper ends of a pair of substantially vertical rods 163. These rods 163 are disposed closely adjacent the inner faces of the two side members 17 of the frame, and are guided in their vertical reciprocatory movement by brackets 164 which are rigid with the frame 16. A pair of ears 166 extend substantially perpendicularly from the plate 162 adjacent the ends thereof. These ears 166 are so spaced from each other that they are adapted to receive a cast grid plate 37 therebetween with the lugs 43 of that casting resting upon the upper edges of the ears 166, as clearly shown in Figure 3.

The parts are so arranged that when the rods 163 are at their upper extreme of movement the plate 162 is interposed between the two mold sections 27 and 34 in position to receive a casting 37 thereupon from the movable mold section 34 upon operation of the ejecting mechanism 65, as hereinabove described. Raising and lowering of the elevator 161 is accomplished by means of a second hydraulic working cylinder 171 mounted upon the outer face of one of the frame's side members 17. This cylinder 171 is preferably arranged vertically with the rod 172 of its plunger extending downwards therefrom to be connected by a link 173 to a crank 174 which is carried by a transversely extending shaft 176 extending transversely of the frame 16 and journalled in the side members 17 thereof. Adjacent the inner face of each of the side members 17, a lever 177 is rigidly mounted upon the transverse shaft 176 and the outer end of each of these levers 177 is pivoted, as indicated at 178, to the lower end of one of the elevator rods 163. The opposite ends of the cylinder 171 are connected by tubes 181 and 182, respectively, to the cylinder 124 of the valve 122 in the battery 117 in the same manner in which the cylinder 111 is connected to the valve 121. The cam 127 associated with the valve 122 is so synchronized with respect to the cam of the valve 121 that the elevator 161 is raised during the opening movement of the mold and reaches its position of greatest elevation with the plate 162 interposed between the mold sections in position to receive the casting 37 just as the movable mold section 34 arrives at its position of widest opening. Accordingly, upon operation of the cast-ejecting mechanism 65, the casting 37 drops onto the plate 162 with its lugs 43 engaged upon the ears 166 of the plate 162. Immediately thereafter, the lower portion of the associated cam 127 moves into engagement with the associated valve rod 126, so actuating the valve 122 that the elevator 161 is lowered, carrying with it the casting 37 and depositing that casting upon the conveyor 160 which extends horizontally and is disposed directly below the opening which is formed when the mold sections separate.

This conveyor 160 comprises a pair of spaced, parallel longitudinally extending tracks 191 below each half of the double mold. All four of these tracks 191 are mounted upon transversely extending rods (not shown) rigidly interconnecting the frame's side members 17. Each track 191 comprises a flat plate disposed in a vertical plane with its upper edge 192 extending substantially horizontally aft from a position a material distance in front of a point directly below the opening which is formed when the mold sections open. The after end 193 of the plate defining each track 191 extends substantially vertically downwards from the upper edge 192. Moreover, each plate or track 191 is of such length that it intersects the path of downward movement of the lugs 43 of a casting 37 being lowered by the associated portion of the elevator mechanism 161, it being understood that one such portion is associated with each of the two pairs of tracks 191.

A conveyor preferably in the form of a roller chain 196 is carried by each of the tracks 191. Each of these chains 196 is endless and is movable by means of a sprocket 197 adjacent the forward end of the associated track 191. Each chain 196 is provided with a plurality of crescent shaped brackets 201 at equally spaced intervals throughout its length and in such position upon its associated conveyor chain 196 that corresponding brackets 201 of all four chains are in transverse alignment with each other. Each crescent shaped bracket 201 opens upwards and toward the front of the machine, i. e., upwards and to the right as viewed upon Figure 6.

Therefore, in view of the fact that the upper run of each conveyor 196 is moved by its associated sprocket 197 toward the rear of the machine, as indicated by the arrow D on Fig. 6, each bracket 201 opens upwardly and rearwardly with respect to its direction of movement along the track 191. It is apparent, therefore, that as each bracket 201 is moved by its chain 196 around the upper after corner of its track 191, constituting the intersection of the top edge 192 and after edge 193 of the track, it takes a position wherein the bracket opens upwardly and to the left, or, as viewed in Figure 6, or, stated otherwise, upwardly and toward the rear of the machine and therefore still capable of supporting the casting 37, one of the lugs 43 of which is disposed within that bracket. However, as a bracket 201 passes around the corner 202 which constitutes the intersection of the after edge 193 and bottom edge 203 of the track 191, the bracket takes a position wherein it opens downwardly and therefore releases the lug 43 and permits the casting 37 to drop from the conveyor.

A trimming mechanism, indicated in its entirety at 211 and illustrated in detail in Figures 7, 8, and 9, includes a transverse stationary platen 212 mounted on end between the frame's side members 17 in an inclined position. This stationary platen 212 is so positioned with respect to the after ends of the tracks 191 that a grid plate 37 is lowered by the downwardly moving portions of the associated conveyor 196 traversing the vertical after ends 193 of the tracks 191, the lower edge of that casting 37 enters the space 213 between the stationary platen 212 and the movable platen 214 which constitutes the shearing head for trimming the dead head 47 and waste strip 46 and flattening the remaining portion of the casting.

The stationary platen 212 is provided with preferably removable top and bottom die inserts 216 and 217, respectively, with which top and bottom shearing knives 218 and 219, respectively, carried by the movable platen 214 are adapted to cooperate. The movable platen 214 is guided in movement toward and away from the stationary platen 212 as by means of a plurality of columns 221 preferably fixed to the ends of the movable platen 214 and slidable within suitable sockets (not shown) in the stationary platen 212.

A plurality of plate-retaining posts 222 extends slidably through the movable platen 214 so that their inner ends may be pressed into engagement with the face of the stationary platen 212, as by a coil spring 223, under tension between a suitable pin 224 rigid with the after face of the movable platen 214, and a laterally extending arm 226 upon the after end of each post 222. Each post is also provided with a collar 227 adapted to be engaged by a projecting shoulder 228 on a trigger arm 229 which is pivoted as by a pin 231 upon the after face of the movable platen 214. As the movable platen 214 is withdrawn from the stationary platen 212, the posts 222 intially remain stationary, since their respective associated springs 223 cause them to slide through the movable platen 214 as the latter retracts. However, after the movable platen 214 has been removed only a short distance from the stationary platen 212, the shoulder 228 of the trigger arm 229 engages the associated collar 227, after which continued retractile movement of the movable platen 214 is accompanied by retraction of the posts 222 until the inclined after end 232 of each trigger arm 229 engages a rod 233 extending transversely between side members 17 of the frame and causes each trigger arm 229 to be lifted, against the action of a tension spring 234, until the shoulder 228 releases the collar 227 permitting the spring 223 to return the post 222 to that position in which it is illustrated in Figure 8. When in this position, the several posts 222 are adapted to be engaged by the laterally projecting lugs 43 of a cast grid plate 37 and thus accurately position the grid plate which has been permitted to come to rest thereon by downward movement of the crescent shaped brackets 201 as they move downward transversing the vertical after ends 193 of the associated tracks 191.

However, after the movable platen 214 has advanced toward the stationary platen 212 far enough to complete the trimming action and thereafter been retracted from the stationary platen 212 until the retaining posts 222 are engaged by the trigger arms 229 and withdrawn from engagement with the stationary platen 212, the grid plate which has just had its dead head 44 and waste strip 46 removed by the trimming action will be released by withdrawal of the retaining posts 222 from under its lug 43. This permits the trimmed casting 37 to drop through the trimming mechanism 211 to be received upon storage bars 241 (see Figures 1, 8 and 9), a pair of which is located below each trimmer 211, the bars 241 of each pair being so spaced that the castings 37 are adapted to drop therebetween and thus permit the laterally extending lugs 43 to come to rest upon the bars 241.

A stacking bar 242 is slidable in transversely aligned and longitudinally extending slots 243 in each pair of storage bars 241 as illustrated in Figures 8 and 9, and each stacking bar 242 is adapted to be reciprocated in a direction parallel to the storage bars 241 by links 244 interconnecting the associated stacking bar 242 and brackets 246 carried by the movable platen 214.

The construction, mounting, and operation of the cast-flattening and ejecting plate 251 are substantially the same as described in my aforesaid patent and therefore need not be described in detail herein.

Operation of the trimming mechanism 211 is effected by means of a plurality of cranks 256 (Fig. 1) rigid with and extending angularly downwardly and rearwardly from the shaft 58 which as explained hereinabove is intermittently rocked through a sufficient number of degrees of rotational movement to result in the opening and closing movements of the movable jaw 33. Each of these cranks 256 has its lower end connected as by a link 257 to the movable platen 214 of the associated trimming mechanism 211, with the result that both trimming mechanisms are closed so as to accomplish the trimming function as the movable jaw 33 of the grid casting mechanism is opened.

Means are provided for intermittently advancing the conveyor 196 so as to advance castings 37 disposed thereon by the elevator 161 until they are dropped into the trimmers 211. All of the sprockets 197 are carried by a transversely extending shaft 261 (Figures 1, 4, and 12), one end of which extends through the associated frame's side member 17 and carries a pinion gear 262 enmeshed by a rack 263. This rack 263 is adapted to be reciprocated by the plunger 264 of another hydraulic working cylinder 266 which is connected by tubes 267 and 268 to the third valve 123 of the battery 117 in the same manner in which the cylinders 111 and 171 are connected to the valves 121 and 122, respectively. The cam 127 associated with the valve 123 is so synchronized with respect to the other cams on the shaft 128 that the plunger 264 is retracted into the cylinder 266 shortly after completion of lowering movement of the elevator 161, i. e., after the elevator has deposited a casting 37 from the opened mold onto the associated conveyor 196 with the lugs 43 of that casting resting within a pair of aligned crescent shaped brackets 201, as hereinabove described. Moreover, the cam 127 associated with the valve 123 is so designed that upon completion of the closing stroke of the movable jaw 33, the plunger 264 and with it the rack 263, will be advanced to the right, as viewed upon Figure 1. This return motion of the rack 263 does not impart motion to the conveyors 196 inasmuch as the pinion 262 is mounted for free rotation upon the shaft 261 but carries a pawl 271 urged by a spring (not shown) into such engagement with a gear 272 that it imparts rotary movement to the gear 272 only when turning counter-clockwise, as viewed in Figure 1, and not upon reverse rotation of the pinion gear 262.

The driven gear 272 is rigidly secured to the shaft 261 as by a key 273, with the result that this counterclockwise rotation of the driven gear 272 imparts advancing movement to the several conveyors 196 since the several sprockets 197 also are rigidly secured to the shaft 261. A cam 281 is also rigidly mounted upon the shaft 261 preferably by means of the same key 273 as that which is used in affixing the driven gear 272 to the shaft 261. This cam 281 is so arranged that when the rack 263 approaches its limit of retractile movement, the cam 281 engages a pin 282 extending laterally from a push rod 283 extending vertically upwards from the shaft 261 and horizontally mounted for vertical reciprocating movement alongside a vertically extending post 284, one of which is provided upon each side member 17 of the frame 16 to enhance the rigidity of the forwardly extending arms 21 and 22. In order to guide the rod 283 in its vertical movement, the lower end of the rod 283 is provided with a slot 286 through which the shaft 261 extends, and a bracket 287 slidably engages the rod 283 at a suitable distance above the shaft 261, this bracket 287 being rigidly mounted upon the associated post 284.

A rock shaft 291 extending transversely across the front of the machine is journalled in bearings 292 rigidly mounted upon the upper ends of the two frame posts 284. A plurality of levers 293 (see Fig. 1) are rigid with the rock shaft 291, extending toward the rear of the machine therefrom. One of these levers 293 is provided with a forward extension 294 carrying a laterally extending pin 296 (see Fig. 4) in position to be engaged by the upper end of the push rod 283 and thereby impart rocking movement to the rock shaft 291 and all of the levers 293 each time the rod 283 is reciprocated. A coil spring 297 is under tension between a pin 298 on one of the levers 293 and a pin 299 rigid with one of the arms 21 of the frame 16. The function of this spring 297 is to releasably retain a pair of ladles 301 (see Figures 1 and 2), one of which is carried by each pair of levers 293, substantially horizontal until they are tipped as the result of forward movement of the push rod 283 and the consequent rocking movement which it imparts to the shaft 291 and all of the levers 293. The parts are so proportioned and arranged that when the ladles 301 are tipped, each empties its contents into the associated portion of the mold cavity which is defined when the two mold sections 27 and 34 are in closed relation. Preferably a sprue mouth is defined by cooperating inclined surfaces 302 and 303 (Fig. 3) along the upper edges of the mold sections 27 and 34, respectively, leading into the mold cavity.

Molten lead at suitable temperature is kept constantly available in a suitable source of supply, such as a heated and preferably thermally insulated reservoir 311 (Fig. 1). Molten lead is fed from this reservoir 311 through conduits 312 to a pair of metering valves 313; and inasmuch as the details of construction of these metering valves 313 form no part of the present invention, it is not necessary to describe them herein beyond explaining that each valve is opened when a plunger 314 projecting upwardly from the top of its housing is raised.

A yoke 316 rigidly secured to each of the valve plungers 314 is connected at its lower end to one end of a lever 317 mounted for rocking movement upon a bracket 318 extending from the associated valve 313. The other end of the lever 317 is engaged by a rod 319 which extends through the lever 317 so that a nut 321 threaded onto the upper end of the rod 319 can engage the upper surface of the lever 317 when the rod 319 moves downward. The lower end of this rod 319 is pivotally connected to one of the levers 293 on the opposite side of the rock shaft 291. The nut 321 is so adjusted upon the rod 319 that it opens the associated valve 313 when the ladles 301 are in their upper or substantially horizontal position, but permit the valve to close when the ladles 301 are lowered, thus raising the rod 319.

A weight 322 on the plunger 314 of each valve 313 aids in maintaining tight closure of that valve. Extent of opening of each valve 313 is readily and accurately regulable by adjustment of the nut 321. In this manner, the exact amount of molten lead to fill the molds is supplied to the ladles 301 each time the ladles 301 are raised to their horizontal position. A trough or other suitable conduit 323 leads from each valve 313 to the associated ladle 301 so as to conduct the molten lead from the valve to its associated ladle whenever the valve is opened.

I claim:

1. In a casting and trimming machine of the character described, a mold comprising separable matrix sections, a cast trimming mechanism comprising sections separable to form a cast-receiving space therebetween, and a mechanism for transferring casts from said mold to said trimming mechanism comprising a pair of tracks disposed below said mold and extending to a position above said cast-receiving space, a flexible conveyor movable upon and guided by each of said tracks, cooperative transversely aligned brackets carried by said conveyors and adapted to receive successive casts from said mold, means for advancing said conveyors simultaneously to carry said casts to said trimming mechanism, and means for lowering said brackets when a cast supported therein is disposed above said cast-receiving space, and means operative after a portion of a cast has been lowered into said cast-receiving space for inverting the associated ones of said brackets to release that cast therefrom and thereby deliver the cast into said trimming mechanism.

2. In a casting and trimming machine of the character described, a mold comprising separable matrix sections, a cast trimming mechanism comprising sections separable to form a cast-receiving space therebetween, and a mechanism for transferring casts from said mold to said trimming mechanism comprising a pair of tracks disposed below said mold, each comprising a substantially horizontal portion extending to a position above said trimming mechanism and a portion extending downwardly toward said cast-receiving space, a flexible conveyor movable upon and guided by each of said tracks, brackets carried by said conveyors and adapted to receive casts from said mold, means for advancing said conveyors forwardly along said horizontal portions of said tracks to said downwardly-extending portions and thence downwardly therealong toward said trimming mechanism, and means for actuating said brackets to release a cast therefrom when the cast has been lowered far enough for a portion thereof to enter said cast-receiving space.

3. In a casting and trimming machine of the character described, a mold comprising separable matrix sections, a cast trimming mechanism comprising sections separable to form a cast-receiving space therebetween and a mechanism for transferring casts from said mold to said trimming mechanism comprising a pair of tracks disposed below said mold, each comprising a substantially horizontal portion extending to a position above said trimming mechanism and a portion extending downwardly toward said cast-receiving space, a flexible conveyor movable upon and guided by each of said tracks, brackets carried by said conveyors and adapted to receive casts from said mold, means for advancing said conveyors forwardly along said horizontal portions of said tracks to said downwardly-extending portions and thence downwardly therealong toward said trimming mechanism, and means for inverting said brackets successively when the casts carried thereby have been lowered far enough for portions thereof to enter said cast-receiving space and thereby releasing said casts into said trimming mechanism.

4. In a casting and trimming machine of the character described, a mold comprising separable matrix sections, a cast trimming mechanism comprising sections separable to form a cast-receiving space therebetween, and a mechanism for transferring casts from said mold to said trimming mechanism comprising a pair of parallel endless tracks, each of said tracks comprising a portion extending forwardly from below said mold to a position above said trimming mechanism, a portion extending downwardly therefrom toward said cast-receiving space, and a return portion extending from the lower end of said downwardly-extending portion to the after end of said forwardly-extending portion, an endless flexible conveyor movable upon and guided by each of said tracks, brackets carried by said conveyors in transverse alignment with each other, each of said brackets having a socket therein opening upwards when the portion of the associated conveyor upon which the bracket is carried is engaged upon said forwardly-extending portion or said downwardly-extending portion of the associated track, but opening downwards when said portion of said conveyor is engaged upon said return portion of the associated track.

5. In a casting and trimming machine of the character described, a mold comprising separable matrix sections, a cast trimming mechanism comprising sections separable to form a cast-receiving space therebetween, a hydraulic cylinder, a piston reciprocable therein and operably connected to said mold and to said trimming mechanism to alternately open and close both, a transfer mechanism for advancing casts received from said mold to said trimming mechanism, a second hydraulic cylinder, a piston reciprocable therein, means operably connecting said transfer mechanism to said piston within said second cylinder to be advanced thereby when the piston moves in one direction but to be released therefrom when the piston returns, means for supplying hydraulic fluid under pressure, and means for alternately conducting said fluid to one end of each of said cylinders and then to the other end of each of said cylinders.

6. In a casting and trimming machine of the character described, a mold comprising separable matrix sections, a cast trimming mechanism comprising sections separable to form a cast-receiving space therebetween, a hydraulic cylinder, a piston reciprocable therein and operably connected to said mold and to said trimming mechanism to alternately open and close both, a transfer mechanism for advancing casts received from said mold to said trimming mechanism, a second hydraulic cylinder, a piston reciprocable therein, means operably connecting said transfer mechanism to said piston within said second cylinder to be advanced thereby when the piston moves in one direction but to be released therefrom when the piston returns, a source of hydraulic fluid under pressure, means for conducting said fluid successively to one end of each of said cylinders to open said mold and said trimming mechanism and thereafter to advance said conveyors, and means operable upon completion of the stroke of each of said pistons for conducting said fluid to the other end of the associated cylinder.

7. In a casting and trimming machine of the character described, a mold comprising separable matrix sections, a cast trimming mechanism comprising sections separable to form a cast-receiving space therebetween, a hydraulic cylinder, a piston reciprocable therein and operably connected to said mold and to said trimming mechanism to alternately open and close both, a transfer mechanism for advancing casts received from said mold to said trimming mechanism, a second hydraulic cylinder, a piston reciprocable therein, means operably connecting said transfer mechanism to said piston within said second cylinder to be advanced thereby when the piston moves in one direction but to be released therefrom when the piston returns, an elevator mounted for reciprocatory movement between an elevated position in receiving relation to said mold between said sections thereof when said sections are separated, a third hydraulic cylinder, a piston reciprocable therein, means operably connecting said elevator to said piston within said third cylinder to be reciprocated thereby, a source of hydraulic fluid under pressure, and means operable to conduct said fluid alternately to opposite ends of each of said cylinders.

8. In a casting and trimming machine of the character described, a stationary mold section, a movable mold section, means pivotally mounting said movable section for arcuate movement optionally into closed position with its matrix face in co-operative relation to said stationary section or into open position withdrawn from and tilting upward toward said stationary section, said pivotal mounting means comprising a link extending upwardly from said movable section and a pivot pin pivotally supporting the upper end of said link, means for receiving cast grids from said mold and lowering them therefrom comprising a plate mounted in inclined position sloping in the same general direction as said movable mold section when in said open position, a pair of ears inclined upwards from said plate and toward said movable mold section, and means operative when said mold sections are separated for raising said plate into the space between said sections in position to receive a cast from said open mold section onto the proximal face of said plate and supported upon said ears, and mechanism for transferring grids from said lowering means comprising a pair of tracks disposed below said mold, a flexible conveyor movable upon and guided by each of said tracks, co-operative transversely aligned brackets carried by said conveyors and adapted to receive successive grids from said lowering means, and means for moving said conveyors simultaneously to carry said grid to a position removed from said lowering means, and means for inverting said brackets when in said removed position.

9. In a machine for making storage battery grid plates, a mechanism for transferring plates from one part to another part of said machine, comprising a pair of parallel tracks extending from a position below said first-mentioned part to a position above said second mentioned part and thence downward to a position more closely adjacent said second mentioned part and thence back toward said first-mentioned position, a flexible conveyor movable upon and guided by each of said tracks, a bracket on one of said conveyors, another bracket in alignment therewith on the other of said conveyors, each of said brackets being substantially crescent shape and opening obliquely away from the associated track and rearwardly with respect to the direction of its movement along said track, whereby said brackets are adapted to receive the lugs extending laterally from the ends of a grid plate in said first-mentioned position to support said grid plate and transport it past said second-mentioned position to said third-mentioned position and there to release it as said brackets are inverted.

GEORGE A. DONATH.

References Cited in the file of this patent

UNITED STATES PATENTS

| Number | Name | Date |
|---|---|---|
| 1,951,932 | Henry et al. | Mar. 20, 1934 |
| 1,985,893 | Goodrich et al. | Jan. 1, 1935 |
| 2,156,379 | Donath | May 2, 1939 |
| 2,200,886 | Kuhn | May 14, 1940 |
| 2,277,234 | Kerns | Mar. 24, 1942 |
| 2,367,303 | Morin | Jan. 16, 1945 |